(12) United States Patent
Fisher et al.

(10) Patent No.: US 7,809,645 B2
(45) Date of Patent: Oct. 5, 2010

(54) METHODS AND APPARATUSES FOR SEQUESTERING CONTENT

(75) Inventors: Clay Fisher, San Diego, CA (US); Eric Edwards, Milolii, HI (US); Neal Manowitz, Montebello, NY (US); Robert Sato, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 642 days.

(21) Appl. No.: 11/207,253

(22) Filed: Aug. 19, 2005

(65) Prior Publication Data

US 2006/0010073 A1     Jan. 12, 2006

Related U.S. Application Data

(63) Continuation of application No. 10/771,903, filed on Feb. 4, 2004, now abandoned.

(60) Provisional application No. 60/472,691, filed on May 22, 2003.

(51) Int. Cl.
*G06F 21/00*     (2006.01)
(52) U.S. Cl. .............. 705/51; 705/50; 705/52; 705/53; 705/54; 705/55; 705/56; 705/57; 705/58; 705/59

(58) Field of Classification Search ........ 705/750–759
See application file for complete search history.

(56) References Cited

U.S. PATENT DOCUMENTS

| | | | |
|---|---|---|---|
| 5,926,557 A | 7/1999 | King et al. | |
| 6,453,053 B1 | 9/2002 | Wakasu | |
| 6,592,033 B2 | 7/2003 | Jennings et al. | |
| 2002/0169954 A1* | 11/2002 | Bandini et al. | 713/153 |
| 2002/0174102 A1* | 11/2002 | Kyler | 707/1 |

\* cited by examiner

*Primary Examiner*—Calvin Loyd Hewitt, II
*Assistant Examiner*—Cristina Owen Sherr
(74) *Attorney, Agent, or Firm*—John P. O'Banion

(57) ABSTRACT

In one embodiment, the methods and apparatuses sequester content receiving content for use in an application; review the content; automatically sequester the content from the application based on the reviewing; and form a reason associated with the sequestering the content. In another embodiment, the methods and apparatuses receive content for use with an application; determine whether the content is one of acceptable content and unacceptable content; remove the unacceptable content from the application; form an explanation for the unacceptable content; and store the unacceptable content and the explanation in an off-line storage device.

30 Claims, 7 Drawing Sheets

700

The following content is found
to be unacceptable and is rejected

710 — Title          Reason
    XXXX           XXXX — 720

(Inquiry) I wish to make further inquiry
730        or contest this decision

810 — Title       Reason — 820
    XXXX        Copyrighted Materials

Content is acceptable because:

830 {
☐ Content does not contain
   copyrighted materials
☐ Content contains copyrighted
   material but have permission to use
☐ Other Reason
}

FIG. 8

METHODS AND APPARATUSES FOR SEQUESTERING CONTENT

CROSS REFERENCE TO RELATED APPLICATIONS

The present application is a continuation of, and claims priority to, U.S. application Ser. No. 10/771,903, filed Feb. 4, 2004, now abandoned incorporated herein by reference in its entirety. This application also claims priority to U.S. Provisional Patent Application No. 60/472,691, filed on May 22, 2003, incorporated herein by reference in its entirety.

FIELD OF THE INVENTION

The present invention relates generally to sequestering content and, more particularly, to automatically sequestering content.

BACKGROUND

There has been a proliferation of on-line applications that utilize content uploaded by users. For example, there many electronic photo album and file sharing applications available to users over the Internet.

In some instances, the electronic photo album applications allow the user to submit their own content to create their own photo album. In addition to submitting content, the submitter is also capable of formatting the content and creating their own customized electronic photo album by adding captions, positioning the content, adding backgrounds, and the like. In many instances, the submitter displays the customized electronic photo album to others. In some examples, the submitter can restrict access to the customized electronic photo album by others.

The submitter typically agrees to a "terms of service" agreement with an operator of the application. The terms of service agreement usually informs the submitter that certain content is considered unacceptable for use with the application. Examples of unacceptable content includes pornography, obscene materials, copyrighted materials, illegal materials, and the like.

Some operators of these on-line applications enforce their terms of service agreement in an ad hoc manner relying on spot checks of content or complaints from other users viewing unacceptable content. Other operators automatically check all content uploaded from submitters.

SUMMARY

In one embodiment, the methods and apparatuses sequester content receiving content for use in an application; review the content; automatically sequester the content from the application based on the reviewing; and form a reason associated with the sequestering the content. In another embodiment, the methods and apparatuses receive content for use with an application; determine whether the content is one of acceptable content and unacceptable content; remove the unacceptable content from the application; form an explanation for the unacceptable content; and store the unacceptable content and the explanation in an off-line storage device.

BRIEF DESCRIPTION OF THE DRAWINGS

The accompanying drawings, which are incorporated in and constitute a part of this specification, illustrate and explain one embodiment of the methods and apparatuses for sequestering content. In the drawings.

FIG. 7 is an exemplary notification consistent with one embodiment of the methods and apparatuses for sequestering content; and FIG. 8 is an exemplary notification consistent with one embodiment of the methods and apparatuses for sequestering content.

DETAILED DESCRIPTION

The following detailed description of the methods and apparatuses for sequestering content refers to the accompanying drawings. The detailed description is not intended to limit the methods and apparatuses for sequestering content. Instead, the scope of the methods and apparatuses for sequestering content is defined by the appended claims and equivalents. Those skilled in the art will recognize that many other implementations are possible, consistent with the present invention.

References to "content" includes data such as audio, video, text, graphics, and the like, that are embodied in digital or analog electronic form. References to "applications" includes programs accessible through a network such as the Internet for tasks such as word processing, audio output or editing, video output or editing, digital still photograph viewing or editing, file sharing, and the like, that are embodied in hardware and/or software.

References to an "operator" include individuals, organizations, or entities that manage and maintain the applications. References to a "submitter" includes individuals, organizations, or entities that utilize the applications. References to a "user" refers to either the submitter or the operator.

Figure 1:
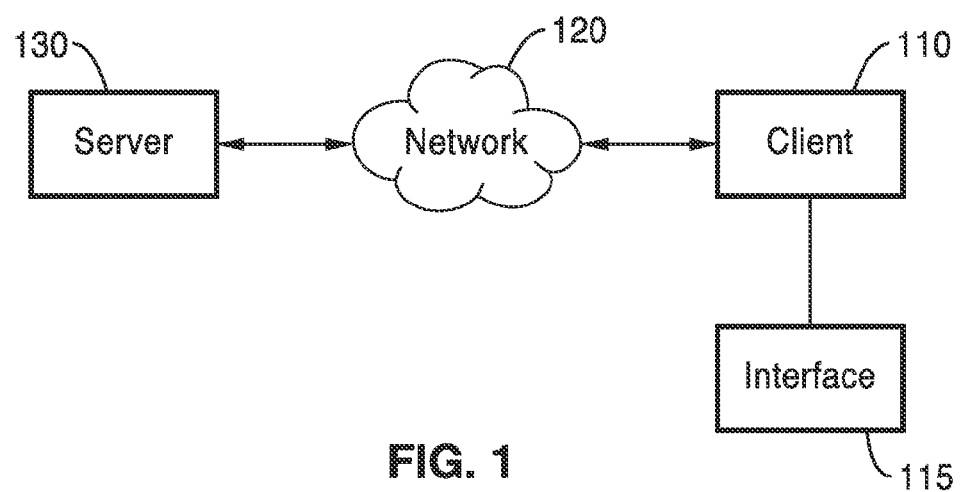
FIG. 1 is a diagram illustrating an environment within which the methods and apparatuses for sequestering content are implemented.

FIG. 1 is a diagram illustrating an environment within which the methods and apparatuses for sequestering content are implemented. The environment includes an electronic device 110 (e.g., a computing platform configured to act as a client device, such as a personal computer, a personal digital assistant, a cellular telephone, a paging device), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device (mouse, trackball, etc.), a microphone, a speaker, a display, a camera) are physically separate from, and are conventionally coupled to, electronic device 110. The user utilizes interface 115 to access and control content and applications stored in electronic device 110, server 130, or a remote storage device (not shown) coupled via network 120.

In accordance with the invention, embodiments of sequestering content as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

The methods and apparatuses for sequestering content are shown in the context of exemplary embodiments of applications in which a user posts content on the application. In some embodiments, the submitter posts the content through the electronic device 110 and the network 120. In some embodiments, the content posted by the submitter is utilized by the application which is located within the server 130. Exemplary applications include a file sharing application, an electronic photo album application, and the like.

In one embodiment, the methods and apparatuses for sequestering content automatically reviews the content provided by the submitter and prevents the application from accessing selected unacceptable content based on this review. In some instances, the selected unacceptable content is moved to an off-line storage and is unavailable to both the submitter that posted the selected unacceptable content and other third party users attempting to view the selected unacceptable content through the application. In other instances, the selected unacceptable content is returned back to the submitter or is made available to the application depending on the subject matter of the content.

In one embodiment, the methods and apparatuses for sequestering content automatically records a reason to explain why the content is considered unacceptable. In some embodiments, this reason is documented and linked to the unacceptable content for future reference.

In one embodiment, the methods and apparatuses for sequestering content automatically notifies the submitter that the content is unacceptable. In some embodiments, the submitter is also given the reason that the content is considered unacceptable.

In one embodiment, the methods and apparatuses for sequestering content are located within the server 130. In some embodiments, an operator monitors and provides instructions to the methods and apparatuses for sequestering content through the electronic device 110 and the network 120.

Figure 2:
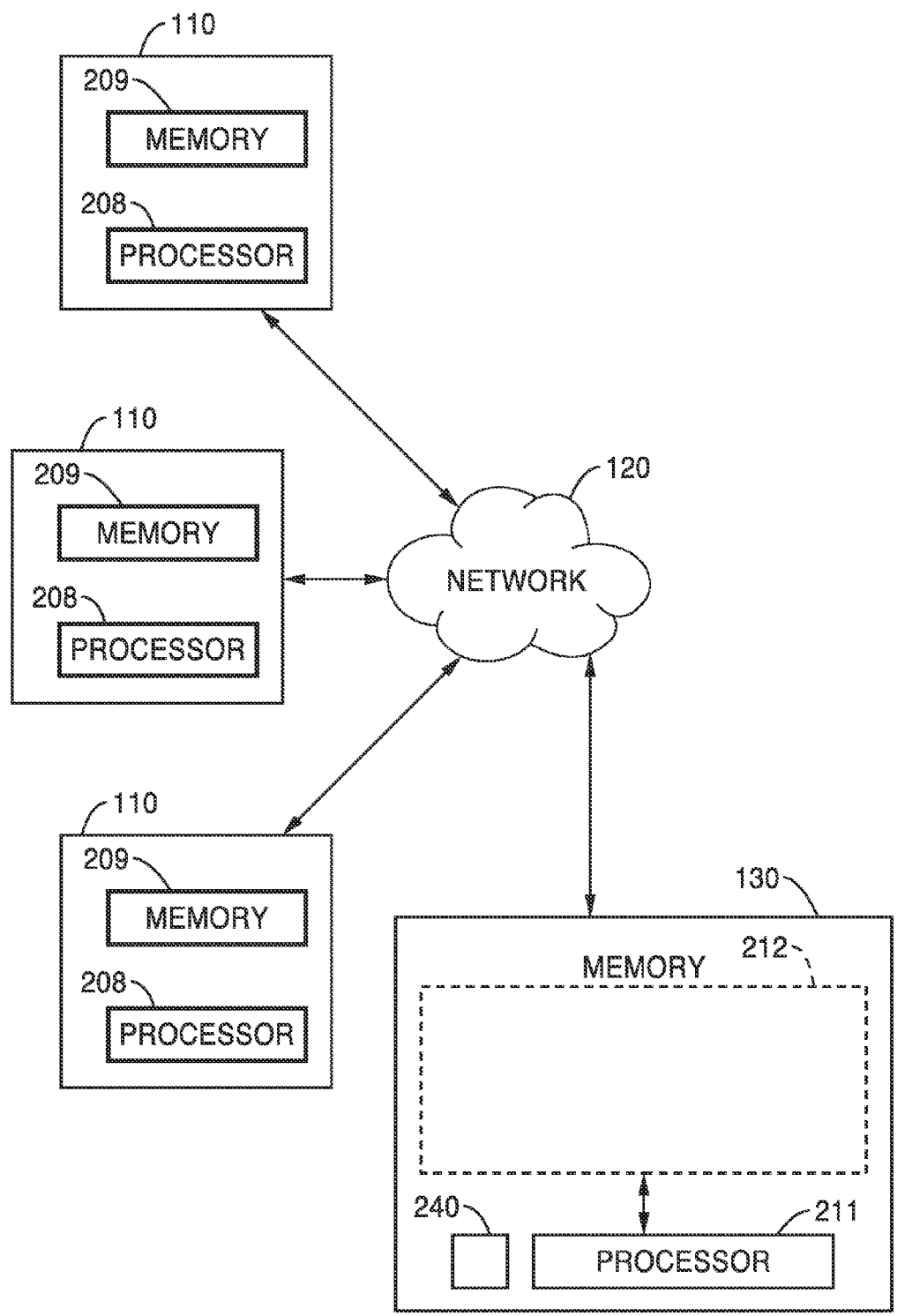
FIG. 2 is a simplified block diagram illustrating one embodiment in which the methods and apparatuses for sequestering content are implemented.

FIG. 2 is a simplified diagram illustrating an exemplary architecture in which the methods and apparatuses for sequestering content are implemented. The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

The plurality of client devices 110 and the server 130 include instructions for a customized application for sequestering content. In one embodiment, the plurality of computer-readable medium 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in memories 209, in memory 211, or a single user application is stored in part in one memory 209 and in part in memory 211. In one instance a stored user application, regardless of storage location, is made customizable based on sequestering content as determined using embodiments described below.

Figure 3:
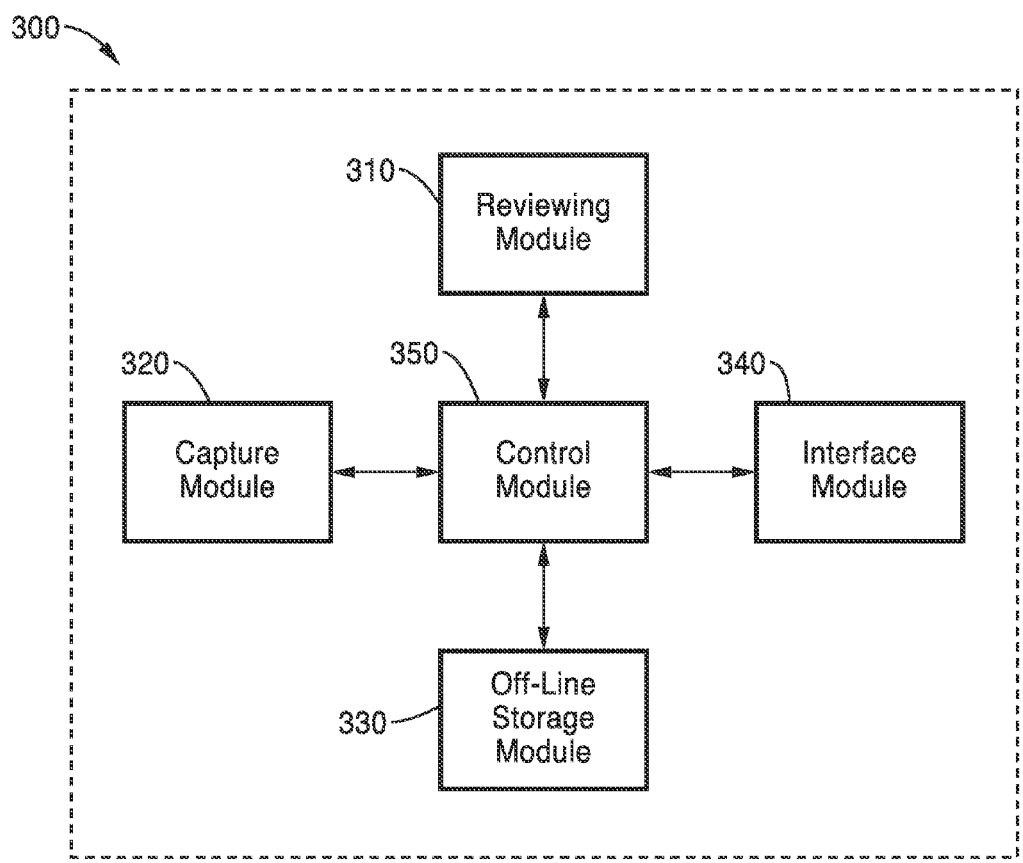
FIG. 3 is a simplified block diagram illustrating a system, consistent with one embodiment of the methods and apparatuses for sequestering content.

FIG. 3 illustrates one embodiment of a sequestering system 300. The sequestering system 300 includes a review module 310, a capture module 320, a storage module 330, an interface module 340, and a control module 350. In some embodiments, the control module 350 communicates with the review module 310, the capture module 320, the storage module 330, and the interface module 340.

In one embodiment, the control module 350 coordinates tasks, requests and communications between the review module 310, the capture module 320, the storage module 330, and the interface module 340.

In one embodiment, the review module 310 analyzes content via the capture module 320. In many embodiments, the review module 310 is configured to analyze the content and identify undesirable content such as copyrighted material, pornographic material, violent material and the like. In some cases, this undesirable content is illegal or violates a terms of service agreement between the submitter and the application. For example, in one instance, the review module 310 analyzes and identifies content as being copyrighted material, because the review module 310 detects that the content contains a watermark. In other embodiments, the review module 310 is customized to identify any type of content.

In another embodiment, the review module 310 is substituted with an operator that reviews the content and determines if the content is unacceptable.

In one embodiment, the review module 310 also annotates the content that is found unacceptable. For example, in one instance, the review module 310 finds that the content is undesirable because the content is copyrighted. In this example, this content is annotated with a label "copyrighted material".

In one embodiment, the capture module 320 identifies specific content for use by the sequestering system 300. In some embodiments, the capture module 320 identifies content that is posted by a submitter. In addition, the capture module 320 supplies content to the review module 310.

In one embodiment, the capture module 320 also identifies descriptive information associated with the content. For example, in one instance, the capture module identifies the location of the content within a photo album, the background color behind the content, a caption describing the content, and the like.

In one embodiment, the off-line storage module 330 stores the content and associated information such that the content and associated information is not available to the submitter or the general public. In some embodiments, the associated information includes formatting information relating to the content and annotations which describe why the content is unacceptable.

In one embodiment, the information stored within the off-line storage module 330 is encrypted. In addition, the content stored within the off-line storage module 330 is stored in an abbreviated form in some embodiments. For example, instead of the content being stored at fully resolution, the content is stored as a thumbnail.

In one embodiment, the annotations explaining reasons why the content is unacceptable which are stored within the off-line storage module are made available to multiple applications. For example, when the annotations are shared with multiple applications, other applications are forewarned about unacceptable content originating from the submitter.

In one embodiment, the interface module 340 receives instructions from an operator of the sequestering system 300. For example, in one instance, the operator instructs the sequestering system 300 to return the content stored within the off-line storage module 330 to the submitter.

In another embodiment, the interface module 340 displays content and information associated with the content to the operator. In some instances, the operator manually reviews content stored within the off-line storage module 330.

In yet another embodiment, the interface module 340 interacts with the submitter regarding the submitter's content that is considered unacceptable. For example, in one instance, the interface module 340 notifies the submitter when the submitter's content is considered unacceptable. In another instance, the submitter provides feedback to the sequestering system 300 regarding the submitter's content via the interface module 340.

In an additional embodiment, the interface module 340 interacts with other applications. For example, in some instances, when content that is submitted to an application from a submitter that is considered unacceptable, the interface module 340 instructs the application to remove the unacceptable content or prevent the unacceptable content from being utilized.

The sequestering system 300 in FIG. 3 is shown for exemplary purposes and is merely one embodiment of the methods and apparatuses for sequestering content. Additional modules may be added to the system 300 without departing from the scope of the methods and apparatuses for sequestering content. Similarly, modules may be combined or deleted without departing from the scope of the methods and apparatuses for sequestering content.

Figure 4:
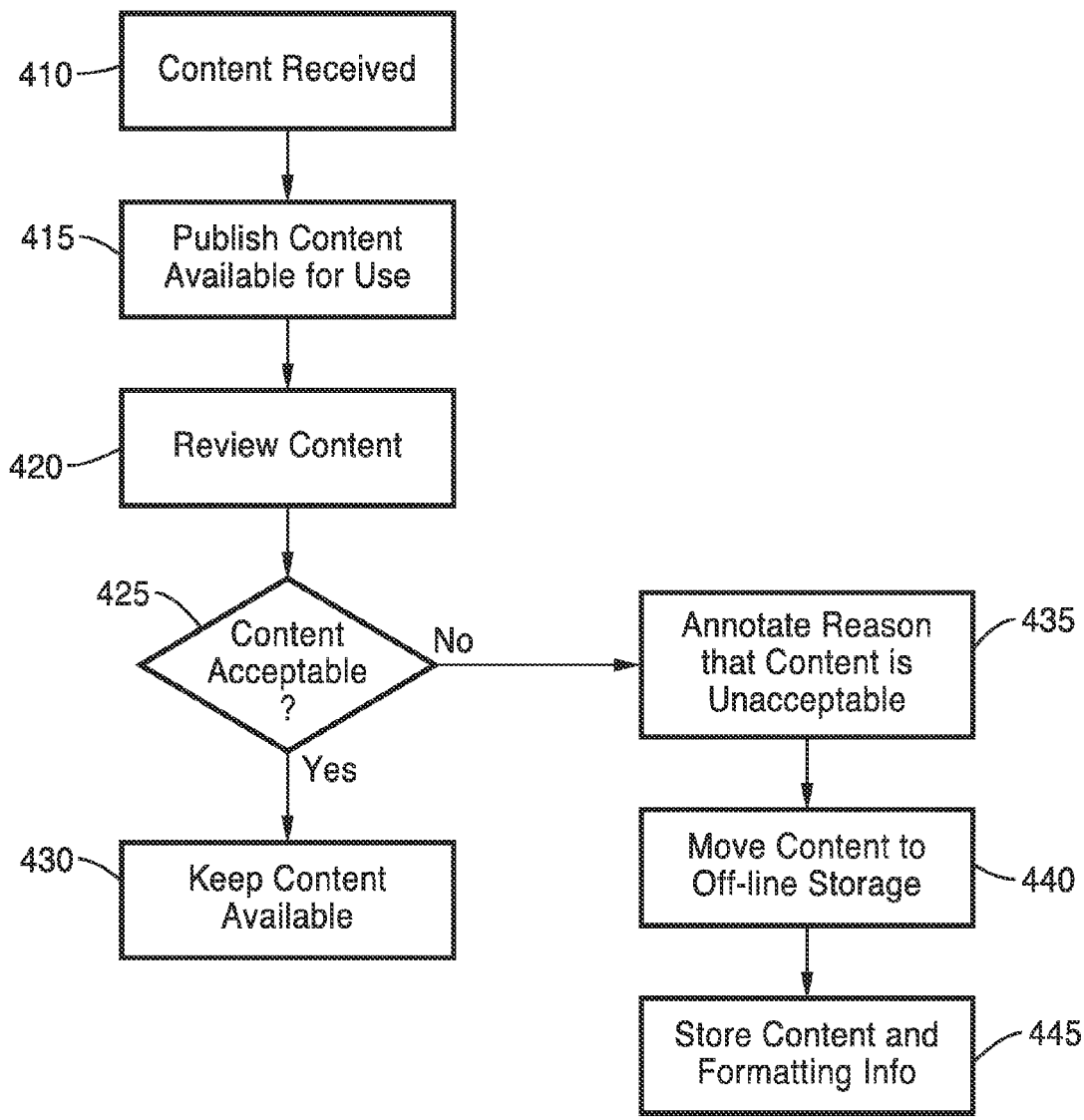
FIG. 4 is a flow diagram consistent with one embodiment of the methods and apparatuses for sequestering content.
Figure 5:
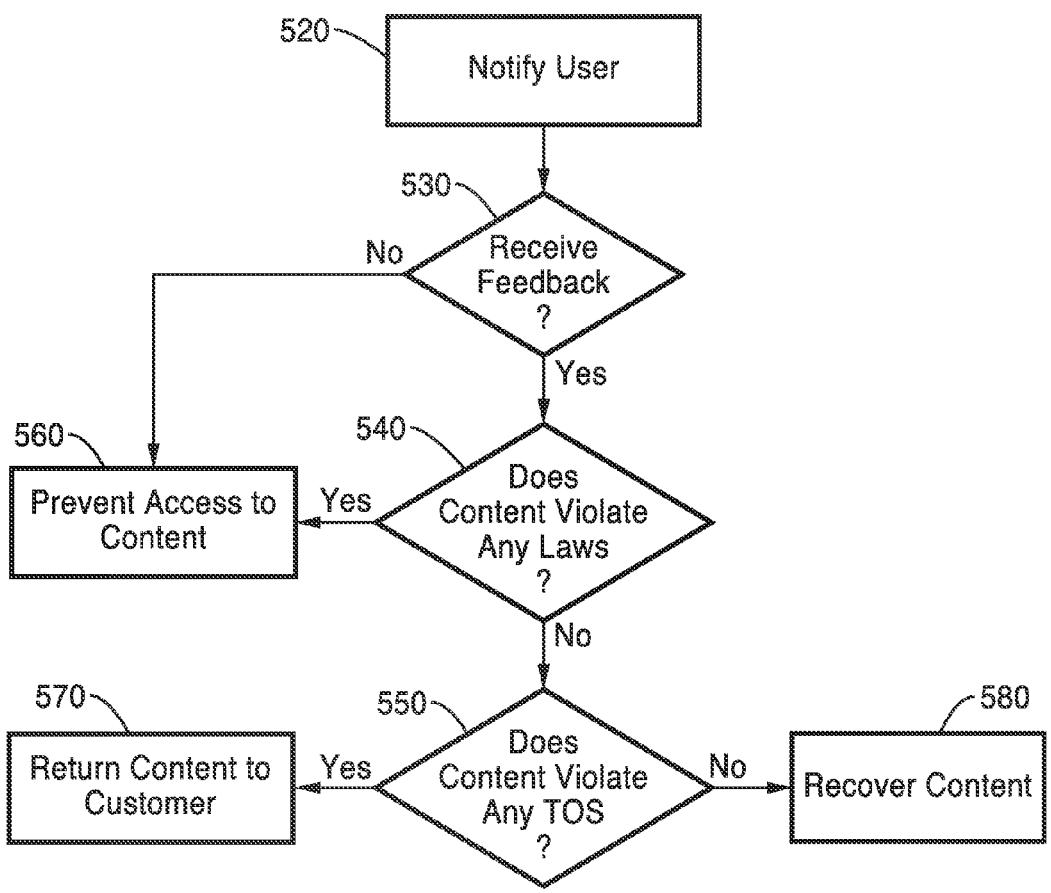
FIG. 5 is a flow diagram consistent with one embodiment of the methods and apparatuses for sequestering content.
Figure 6:
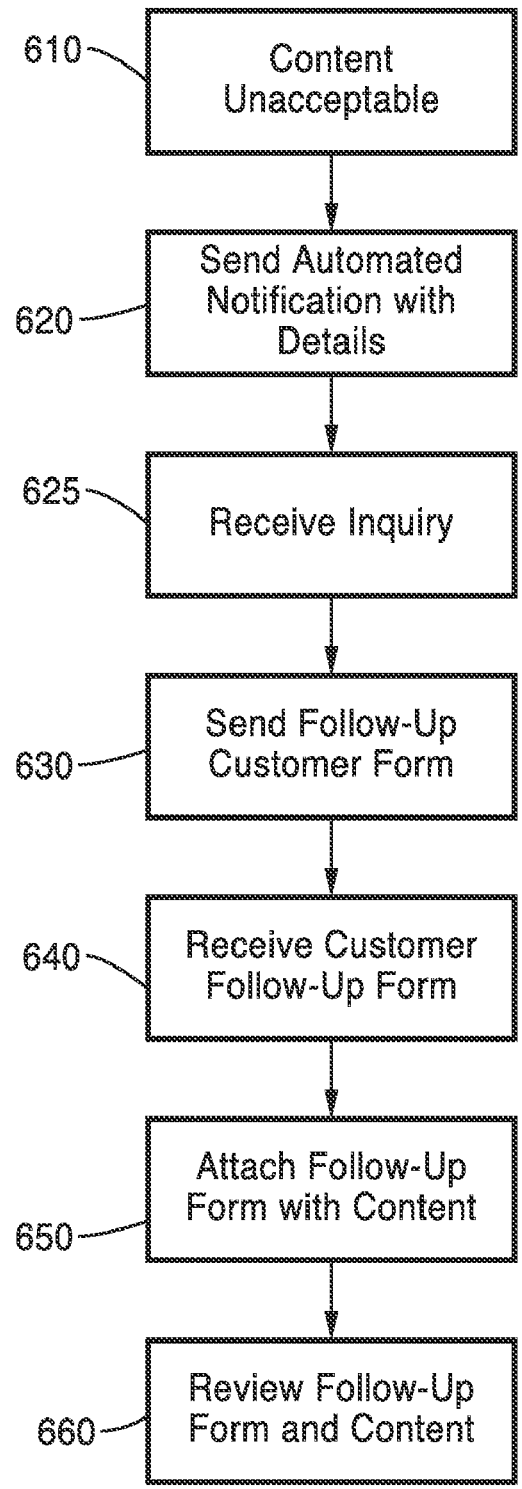
FIG. 6 is a flow diagram consistent with one embodiment of the methods and apparatuses for sequestering content.

The flow diagrams as depicted in FIGS. 4, 5, and 6 are one embodiment of the methods and apparatuses for sequestering content. The blocks within the flow diagrams can be performed in a different sequence without departing from the spirit of the methods and apparatuses for sequestering content. Further, blocks can be deleted, added, or combined without departing from the spirit of the methods and apparatuses for sequestering content.

The flow diagram in FIG. 4 illustrates sequestering content according to one embodiment of the invention. In Block 410, content is received. In one embodiment, the content is sensed by the capture module 320 (FIG. 3). In some instances, the submitter offers the content to be published or viewed on an application such as a file sharing program, a photo album, and the like.

In Block 415, the content is available for use by the application. In one embodiment, the content is published by the application such as a photograph within an electronic on-line photo album application. In another embodiment, the content is made available to others via a file sharing application.

In Block 420, the content is reviewed based on the subject matter of the content. In one embodiment, the content is analyzed by the review module 310 (FIG. 3). In many instances, the content is determined to be either acceptable or unacceptable based on a variety of criteria. For example, if the content is pornography or copyrighted, the content is considered unacceptable. In another example, the content is determined to be unacceptable based on a violation of the terms of service agreement.

In Block 425, the content is deemed either acceptable or unacceptable based on the review of the content in the Block 420.

If the content is considered acceptable, the content remains available to the application in Block 430. For example, if the content is a photograph that was posted in an on-line album in the Block 415, the photograph continues to be available within the Block 430.

If the content is considered unacceptable, the content is annotated with a reason that the content is unacceptable in Block 435. In one instance, the reasons for the content being unacceptable include pornography, copyrighted material, illegal material, and the like.

In Block 440, the unacceptable content and the annotated reason are removed from the application and moved to an off-line storage facility. In one embodiment, the off-line storage facility is the off-line storage module 330 (FIG. 3). When the unacceptable content is removed from the application, the application cannot gain access to the unacceptable content. For example, if the unacceptable content is displayed within the submitter's electronic photo album by an electronic on-line photo album application, once the unacceptable content is removed, the application is notified; and the unacceptable content is no longer displayed within the submitter's electronic photo album.

In Block 445, the unacceptable content, the annotated reason, and any formatting information associated with the unacceptable content are stored in the off-line storage facility. In one embodiment, access to any content within the off-line storage facility is restricted to the operator. In other words, access to content within the off-line storage facility is not available to any applications, the submitter, or other third parties. In another embodiment, access to content within the off-line storage facility is available to others with authorization from the operator.

The flow diagram in FIG. 5 illustrates notifying a submitter of unacceptable content according to one embodiment of the invention. In Block 520, the user is notified that the submitter's content is unacceptable. The Block 520 is a continuation from the Block 445 in FIG. 4. In some embodiments, the submitter is notified via an electronic mail message. In some embodiments, the notification identifies the particular content that is unacceptable. In other embodiments, the notification also includes the reason why the content is deemed unacceptable.

Additionally, in some embodiments, the notification requests feedback from the submitter if the submitter wishes to dispute the classification of the unacceptable content and to clarify the nature of the content. For example, if the notification informs the submitter that the submitter's content appears to be copyrighted material. In this case, the submitter has several options such as not responding if the content is copyrighted; verifying that the submitter has permission to use this copyrighted material; and contesting that the content is not copyrighted.

If feedback from the submitter is not received, the content, associated information, and reason for the content being unacceptable remain stored within the off-line storage and are not accessible to the submitter, any applications, or third parties as shown in Block 560.

In one embodiment, if feedback from the submitter is received, the content is reviewed again in light of the feedback from the submitter. In another embodiment, the content is reviewed by the operator. In yet another embodiment, the content is reviewed again by the review module 310. If the content is considered to violate any laws in the Block 540, the content and associated information remain stored within the off-line storage and are not accessible to the submitter, any applications, or third parties as shown in Block 560. For example, in one instance, public display of pornography is a type of material which can violate the law. Violations of law can vary from jurisdiction to jurisdiction and continually change.

In another embodiment, the threshold in the Block 540 of violating the law is substituted by any standard determined by the operator that prevents the content from being returned to the submitter.

If the content is found to not exceed a threshold as determined in the Block 540, the content is reviewed for compliance with the terms of service as agreed upon by the submitter in Block 550. For example, some terms of service agreements prohibit posting copyrighted works, files over a predetermined size, and the like. If the content is determined to violate the terms of service agreement but otherwise considered returnable content, the content is returned to the submitter with an additional notification to the submitter as shown in Block 570.

In another embodiment, the threshold in the Block 550 of violating the terms of service agreement is substituted by any standard determined by the operator that prevents the content from being posted by the application but returnable to the submitter.

If the content is considered to conform to the terms of service agreement in the Block 550 and the threshold in the Block 540, the content and associated information is recovered from the off-line storage and made available for use by applications as shown in Block 580.

For example, a photograph posted in an electronic photo album application is originally found unacceptable in the Block 425 and moved to the off-line storage such that the posted photograph was no longer available to the electronic photo album application in the Block 440. The reason for the content being found unacceptable is documented and stored in the Block 435.

In this example, the submitter is notified in the Block 520 of the content being found unacceptable. However, this photograph was subsequently found acceptable because upon re-evaluation, the photograph conforms to legal standards and the "terms of service" in the Blocks 540 and 550. In this example, this photograph and formatting information associated with the photograph is returned to the electronic photo album application so that the photograph is re-displayed in the electronic photo album application in the same format as originally specified by the submitter in the Block 580.

In one embodiment, the photograph is automatically re-displayed in the electronic photo album application without input from either the submitter or the operator.

In another example, if the photograph was found to conform with legal standards (Block 540) but fails to conform to the terms of service agreement, the photograph is returned to the submitter in the Block 570.

The flow diagram in FIG. 6 illustrates interacting with a submitter regarding sequestering content according to one embodiment of the invention. In Block 610 content submitted by a submitter is found to be unacceptable.

In Block 620, an automated notification form is sent to the submitter identifying the unacceptable content and the reason for finding the content unacceptable. In addition, in some embodiments, the automated notification form also allows the submitter to make an inquiry regarding the unacceptable content. In FIG. 7, the automated notification form 700 is shown for exemplary purposes. The form 700 includes a title field 710 to identify the unacceptable content, a reason field 720 to indicate the reason for finding the content unacceptable, and an inquiry button 730 to allow the submitter to inquire further regarding the unacceptable content. In some embodiments, when the submitter selects the inquiry button 730, an inquiry is automatically transmitted to initiate a review process.

In Block 625, the inquiry from the user regarding the automated notification form is received and the review process of the unacceptable content is initiated.

In Block 630, the submitter is sent a follow-up form which requests additional details from the submitter regarding the unacceptable content. In FIG. 8, a sample follow-up form 800 is shown. The form 800 includes a title field 810 to identify the unacceptable content, a reason field 820 to indicate the reason for finding the content unacceptable, and a justification field 830 to indicate the justification that the unacceptable content should be considered acceptable. In this example, the content is considered unacceptable, because the content is believed to contain copyrighted materials. Under the justification field 830, the submitter is able to assert one of the following: the content does not contain copyrighted materials; the content contains copyrighted materials but the submitter has permission to utilize the copyrighted materials; or "other reason" which the submitter types in his/her own justification.

In Block 640, the follow-up form is received from the submitter.

In Block 650, the follow-up form is attached to the corresponding unacceptable content.

In Block 660, the unacceptable content is reassessed based on the follow-up form and the unacceptable content.

The foregoing descriptions of specific embodiments of the invention have been presented for purposes of illustration and description. For example, the invention is described within the context of creating profiles for modifying digital images as merely one embodiment of the invention. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method for sequestering content within an electronic device, comprising:

receiving, by an electronic device, content for use in an electronic photo album application, configured for execution on said electronic device;

placing the content, by the electronic device, in the electronic photo album application;

reviewing, by the electronic device, the content for unacceptable material;

based on the reviewing removing the content, by the electronic device, from the electronic photo album application;

automatically sequestering the content, by the electronic device, from the electronic photo album application, in a separate server or device;

notifying the electronic photo album application that the sequestered content is no longer available; and generating, by the electronic device, a reason why the content has been sequestered in response to reviewing of the content.

2. The method according to claim 1 further comprising annotating the content with the reason for the content being sequestered.

3. The method according to claim 1 wherein the electronic photo album application is configured for viewing, and/or editing, of digital image data.

4. The method according to claim 1 further comprising storing the sequestered content in an off-line storage device.

5. The method according to claim 1 further comprising:
reviewing the content to determine if it is in violation of the terms of a service agreement; and
returning said content to said submitter if said content is found to be in violation of the terms of the service agreement.

6. The method according to claim 1 wherein the sequestering of the content prevents the content from being accessed by the electronic photo album application.

7. The method according to claim 1 wherein the sequestering of the content prevents the content from being accessed by a submitter of the content through the electronic photo album application.

8. The method according to claim 1 further comprising storing format information associated with the content in an off-line storage device.

9. The method according to claim 1 wherein sequestering of the content is performed in response to detecting that the content includes pornography or copyrighted material.

10. The method according to claim 1 wherein the application is an electronic photo album application.

11. The method according to claim 1 further comprising notifying a submitter of the content that the content is not acceptable.

12. The method according to claim 1 further comprising returning the content and format information associated with the content to a submitter.

13. The method according to claim 1 further comprising:
accepting feedback received from a content submitter or a user which disputes the classification of the content; and
restoring the content and format information associated with the content to the electronic photo album application.

14. A system for sequestering content within an electronic device configured as a client capable of executing an electronic photo album application, comprising:
means for receiving content within a client for use by the electronic photo album application of the client;
means for reviewing the subject matter of said content for unlawful material;
means for removing the content, based on the reviewing;
means for automatically sequestering the content, electronic photo album application;
means for notifying the electronic photo album application that the sequestered content is no longer available to the electronic photo album application; and
means for generating a reason why the content has been sequestered in response to reviewing of the content.

15. A method for sequestering content within an electronic device, comprising:

receiving, by an electronic device, content at a client for use by an electronic photo album application of the client;
determining, by the electronic device, whether the content is either acceptable content or unacceptable content, based on legality and the terms of service;
removing, by the electronic device, the unacceptable content from the electronic photo album application;
generating, by the electronic device, an explanation for why the content was considered unacceptable content; and
removing, by the electronic device, the unacceptable content and the explanation from the client and storing the unacceptable content and the explanation in an off-line storage device.

16. The method according to claim 15 wherein the electronic photo album application is configured for viewing, and/or editing, of digital image data.

17. The method according to claim 15 wherein the removing the content prevents the content from being accessed by a submitter of the content through the electronic photo album application.

18. The method according to claim 15 further comprising storing format information associated with the content in the off-line storage device.

19. The method according to claim 18 wherein the format information includes one of location information of the content, background color information for the content, and caption information describing the content.

20. The method according to claim 15 wherein the application is an electronic photo album application.

21. The method according to claim 15 further comprising notifying a submitter that the content is classified as unacceptable content.

22. The method according to claim 15 further comprising:
re-reviewing the content and/or accepting feedback received from a content submitter;
determining that said content is actually acceptable; and
returning the content and format information associated with the content to a submitter.

23. The method according to claim 15 further comprising restoring the unacceptable content and format information associated with the unacceptable content to the electronic photo album application, in response to determining that the content was not actually unacceptable.

24. A system for sequestering content within an electronic device configured as a client capable of executing an electronic photo album application, comprising:
a processor;
memory connected to the processor, storing executable instructions that when executed by the processor cause the processor to perform the steps of:
receiving, by an electronic photo album in an electronic device, content wherein the content is offered by a submitter;
determining whether the content is unacceptable content;
automatically sequestering unacceptable content from the electronic photo album application;
generating an explanation as to why the content was determined to be unacceptable content; and
removing the unacceptable content from the client and automatically storing the unacceptable content in an off-line storage device wherein access to the unacceptable content is unavailable to the submitter.

25. The system according to claim 24 further comprising a capture module configured to identify the content and supply content to said review module.

26. The system according to claim 24 wherein the review module determines unacceptable content by criteria established through a legal standard and/or a terms of service agreement.

27. The system according to claim 24 further comprising an interface module configured for automatically notifying the submitter when the content is considered unacceptable content.

28. The system according to claim 24 wherein the off-line storage module is configured to store format information associated with the unacceptable content.

29. The system according to claim 24 further comprising an interface module configured for automatically notifying an application that the unacceptable content has been removed.

30. A computer-readable storage medium having computer executable instructions which when executed cause the computer to perform the steps, comprising:

receiving content for use with an electronic photo album application of a client executing from a computer;

determining whether the content is either acceptable content or unacceptable content, based on legality and the terms of service;

removing the unacceptable content from the electronic photo album application based on said determining that said content was unacceptable;

generating an explanation as to why the content was determined to be unacceptable content; and removing the unacceptable content and the explanation from the client and storing the unacceptable content and the explanation in an off-line storage device.

* * * * *